Sept. 4, 1934.　　　　B. B. KAHN　　　　1,972,739
SWITCH FOR STOVES
Filed Aug. 17, 1931　　　　2 Sheets-Sheet 1
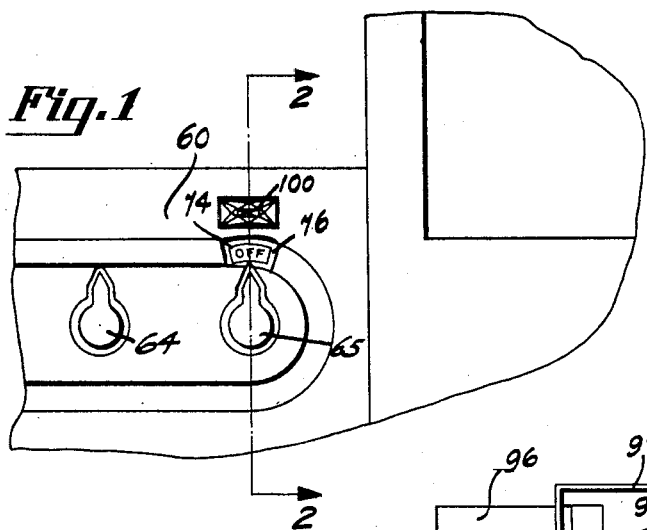
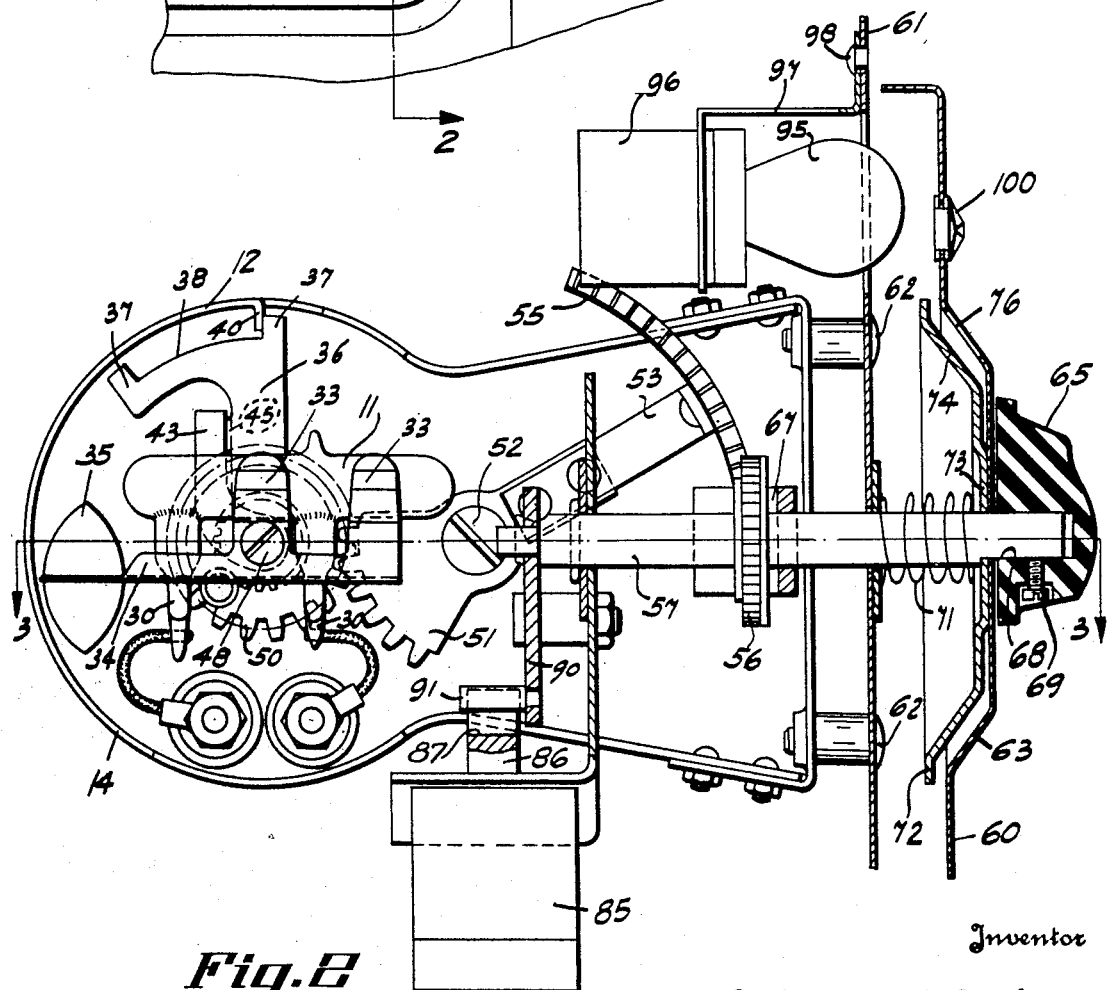
Inventor
Bertrand B. Kahn
By Maréchal and Noe
Attorneys

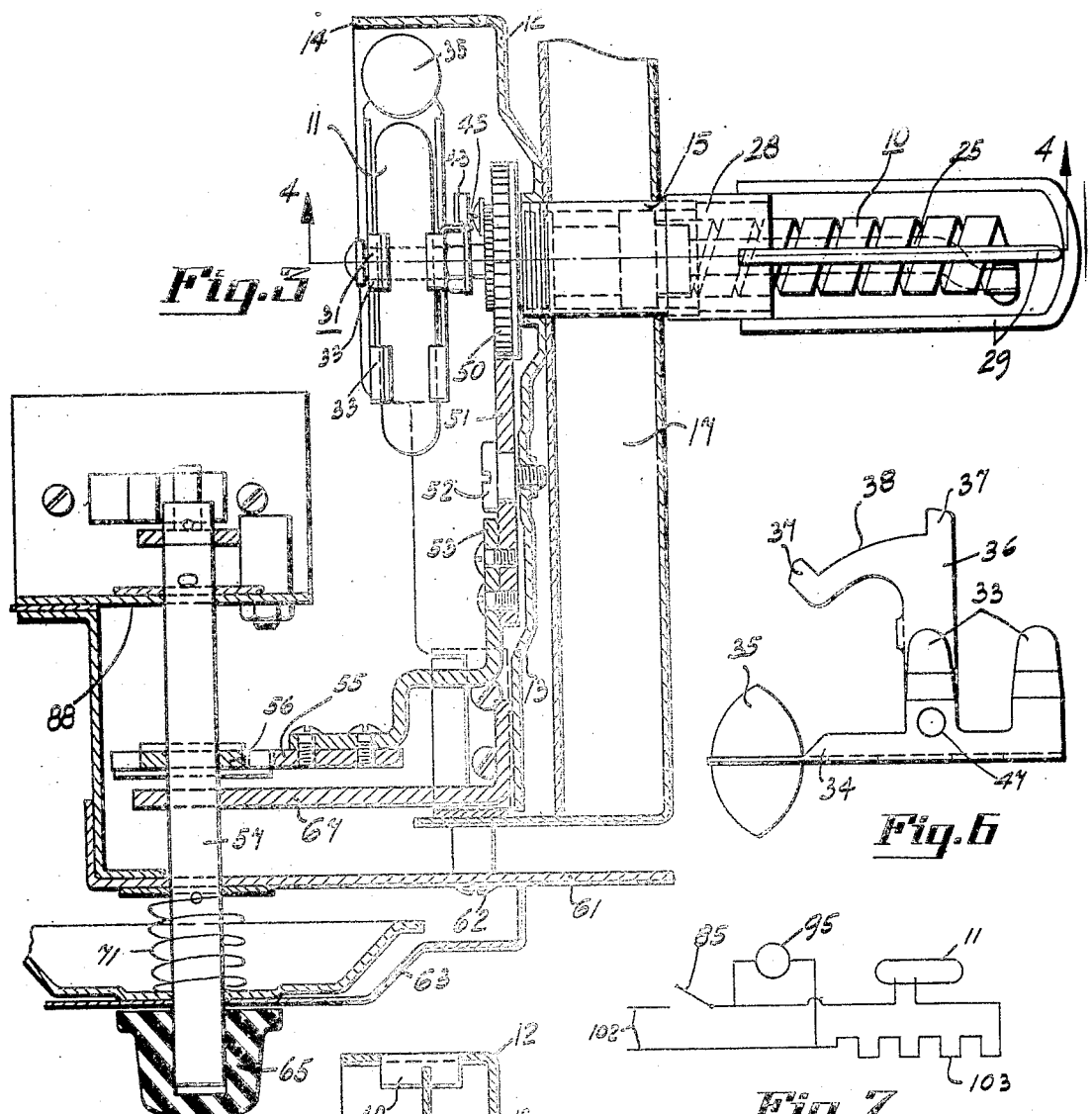

Patented Sept. 4, 1934

1,972,739

UNITED STATES PATENT OFFICE

1,972,739

SWITCH FOR STOVES

Bertrand B. Kahn, Cincinnati, Ohio, assignor to The Estate Stove Company, Hamilton, Ohio, a corporation of Ohio Application August 17, 1931, Serial No. 557,491

8 Claims. (Cl. 200—5)

This invention relates to heating appliances, and more particularly to control devices therefor for regulating the operation of a heating element.

One of the principal objects of the invention is the provision of a control device of simple construction which may be readily regulated to automatically govern the operation of a heating element of a stove or the like.

Another object of the invention is the provision of such a control device having a single operating handle from which the supply of current to a heating element is controlled, and by which the control device is accurately regulated to govern the passage of current to the heating element in accordance with a desired temperature.

Another object of the invention is the provision of a control device incorporating a line switch and a manually adjustable thermostatically regulated control switch, and a single operating handle therefor having an indicator showing the operating condition of the control.

Other objects and advantages of the invention will be apparent from the following description, the accompanying drawings and the appended claims.

In the drawings, which disclose a preferred embodiment of the invention—

Fig. 1 is a fragmentary view of the front of a stove having a control device constructed in accordance with the present invention;

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 3;

Fig. 5 is a fragmentary view of the line-switch and its operating mechanism;

Fig. 6 is a view of the control switch supporting clip; and

Fig. 7 is a wiring diagram illustrating the connections of the control device.

The drawings, in which like characters of reference designate like parts throughout the several views thereof, illustrate a control device which is incorporated in an electric range to control the flow of current to the heating element of a stove oven, and to automatically regulate the current flow to provide a predetermined desired temperature within the heating zone of the element. As shown, the control device comprises generally a heat responsive means 10 which is movable to actuate a control switch 11 connected to the heating element so that upon variation of the stove oven compartment or other heating area to which the device is applied, the control will automatically operate to actuate the switch 11 and thereby regulate the flow of current to the heating element. The heat responsive means 10 and switch 11 are carried within a frame 12 which comprises a plate-like portion 13 having an upwardly extending flange 14 which serves as a partial enclosure for the switch 11 and its associated parts, and a cylindrical shell 15 which projects perpendicularly from the plate 13 and serves as a support for the heat responsive means 10. The frame 12 is so positioned in the stove that the shell 15 projects through a wall 17 of the oven compartment in order that the heat responsive means 10 supported therefrom may be positioned well within the confines of the oven and thus will be within heating range of the element which is to be controlled.

The heat responsive means comprises a bimetallic strip composed of two metals having different coefficients of expansion so that upon temperature change the shape of the bimetallic strip is altered to provide movement for actuating the switch 11. The bimetallic strip, indicated at 20, is shown wound as a helical coil having one end attached, as by means of the screw 21, to a sleeve 22 which is mounted within the frame shell 15. The opposite end of the coil 20 is attached, by means of bolt 23, to a rod 25 which is rotatably mounted within a passage 26 of the sleeve 22. The sleeve opening 26, shell 15 and coil 20 all stand axially aligned. Protection for the exposed portion of the coil 20 is afforded by means of a tubular extension 28 which is attached to and projects beyond the end of the shell 15, and which has attached to it wire loops 29 which serve as an openwork enclosure for the coil. When the heat responsive means is subjected to temperature change the expansion in the coil 20 produces relative rotational movement between the sleeve 22 and the rod 25 for actuation of the switch 11.

The control switch 11 is of the mercury tube type having spaced terminals 30 which are positioned in such a manner that a pool of mercury contained therein, upon moving to one end of the tube, serves to close the circuit between the terminals, and upon tilting the tube in the opposite direction moves away from the terminals to thereby break the circuit. The tube 11 is supported in a clip 31 which is shown as being pivotally mounted for free rotational movement upon a stud end 32 of the rod 25. The tube clip is provided with spaced fingers 33 which grip the tube, and an extending arm 34 which carries a counterweight 35 positioned to constantly urge the tube toward closed circuit position. To limit the rotational movement of the tube and its clip about the stud 32 the clip is provided with a second arm 36 having spaced lugs 37 which define a yoke-like opening 38. The frame flange 14 is provided with a downturned lug 40 which stands so that it will be engaged by the lugs 37 of the tube clip as the tube is turned on its pivot mounting, and is positioned so that the clip under urge of the counterweight 35 will stand substantially horizontal and with the mercury in position closing the terminals 30.

The end of the rod 25 from which the stud 32 projects is threaded as shown at 41 and carries a nut 42 which serves to clamp a radially projecting arm 43 to the rod. This arm moves angularly when the heat responsive element 20 is subjected to temperature change, and it is of such shape as to engage a lug 45 which projects from the arm 36 of the switch clip. The threaded rod end 41 has attached to it a sleeve 46 which serves as the axis of rotation for the pivot holes 47 of the tube clip, and has threaded to its outward end a screw 48 which serves as a retainer for the tube clip.

The assembly of the bimetallic coil 20 is such that when it is subjected to an increase in temperature the rod 25 and attached arm 43 are caused to move in a clockwise direction (as viewed in Fig. 2) and will therefore, upon sufficient movement, eventually engage the lug 45 of the tube clip to move the clip and tube against the force of the counterweight 35 to open circuit position. As the current is then cut off from the element the air heated thereby and circulating around the coil 20 cools which results in reverse movement of the rod and arm 43 thereby returning the mercury tube 11 to its initial position in which the circuit is again closed.

To permit of adjustment whereby the heat responsive means may be regulated to maintain a desired temperature in the oven compartment, the sleeve 22 is rotatably mounted in the supporting shell 15 so that the entire assembly of sleeve, coil 20 and rod 25 may be bodily rotated to thereby vary the spacing between the arm 43 and switch lug 45. As shown, the sleeve 22 has adjustably attached to it a spur-gear 50 which has meshing with it a gear sector 51 pivotally supported from the frame 12 by means of the screw 52. An oppositely projecting arm 53 of the sector carries a curved rack 55 which is engaged by a spur-gear 56 fixed to a control shaft 57. The arrangement of the intermeshing gearing is such that the axis of rotation of the control shaft 57 and the axis of rotation of the heat responsive means stand perpendicularly with respect to one another. Such an arrangement of parts permits the heat responsive means to stand within the oven compartment while supported from an oven wall, and permits the control shaft 57 to stand perpendicularly with respect to the vertical front 60 of the stove through which it projects for attachment of an operating handle. As shown, the stove front comprises a vertically extending frame structure 61 to which the frame 12 is attached by means of the screws 62. A cover plate 63 serves to complete the enclosure of the stove front, and is provided with openings through which the various heating element switch shafts project for attachment of operating handles as shown at 64 and 65. The control shaft 57, which is shown partially supported from the housing 12 by means of an extending arm 67, extends beyond the plate 63 and at its outward end is flatted as shown at 68 to receive the control handle or knob 65 which is held thereon by means of the screw 69. An indicating dial 72 is mounted on the shaft 57 behind the plate 63 and is positioned relatively to the shaft by engagement with the flat 68 on the shaft end. If desired a spring 71 may be provided to aid in properly positioning the dial. The dial 72 comprises a disk-like portion 73 having a flange extension of conical form. The cover plate 63 is embossed to receive the dial 72 behind it, and is provided with an opening 76 through which the conical portion 74 of the dial is visible. The dial carries markings to indicate the operating condition of the control device and in addition is calibrated to permit accurate adjustment of the heat responsive means whereby the operation of the switch 11 may be regulated to provide a desired oven temperature.

An adjustment is provided in the heat responsive means whereby the operation of the switch actuating arm 43 may be coordinated with the calibration of the dial 72. The gear 50 is rotatably mounted upon a hub extension 80 of the sleeve 22 which projects beyond the gear and has attached to it an overlying flange 81 which is preferably formed with teeth similar to those of a spur-gear. The gear 50 has threadedly engaging it a screw 82 which may be loosened to permit free rotational movement of the gear 50 relatively to the sleeve 22. Upon adjusting the heat responsive means so that the mercury switch 11 is moved to open circuit position at a temperature corresponding to the setting of the dial 72, the screw 82 is drawn tight to clamp against the flange 81 so that the heat responsive means is then held to move with the control shaft 57.

The shaft 57 serves also to actuate a line switch 85 connected into the supply of current to the heating element and the control device. The switch 85 is of conventional toggle construction having a pivotally movable operating arm 86 which is slotted at its end to provide a yoke-like opening 87. The switch 85 is supported from the stove frame by means of a plate 88 which serves also as a pivotal support for the shaft 57. The end of the shaft 57 adjacent the switch 85 carries a perpendicularly extending arm 90 from which a pin end 91 projects. Upon rotation of the shaft 57 the pin end 91 describes a circular path which is so related to the positioning of the operating arm 86 of the switch as to engage the yoke 87 and thereby operate the switch in passing through the operating range of the arm 86. The plate 88 carries a projecting stud 92 which serves as a stop engaged by the arm 90 to limit the rotational movement of the shaft 57 and define the "off" position of the control. When the shaft 57 stands in "off" position with the arm 90 engaging the stop stud 92, the pin 91 stands in engaging relationship with the yoke 87 of the switch 85 in "off" position, and the dial 72 indicates "off". Upon moving the handle 65 in a clockwise direction (as viewed in Fig. 1) movement of the pin 91 causes the switch 85 to be turned to "on" position and causes simultaneous movement of the sleeve 22 and entire heat responsive means including the arm 43. Continued movement of the handle 65 provides for regulation of the heat responsive means to act in accordance with the temperature calibration showing through the opening 76.

A pilot light 95 carried in a socket 96 supported on a bracket 97 attached at 98 to the stove frame 61 is positioned behind the cover plate 63 so as to show through a colored glass 100 and thus provide additional indication of the operation of the control device. The pilot 95 also serves as a means of illuminating the exposed portion of the dial face.

As shown in the wiring diagram of Fig. 7, current supplied from the leads 102 is controlled by the line switch 85 before passing to the pilot light 95 and to the mercury switch 11 which, after closure of the switch 85, regulates the flow of current to the heating element 103.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a stove, a current control for a heating element comprising heat responsive means, a control switch associated with said heat responsive means for automatic operation thereby, means for adjusting said heat responsive means for operation of said control switch at a predetermined temperature, a line-switch in the control switch circuit, and a single manually operable means for actuating said line-switch and for operating said adjusting means.

2. In a stove, a current control for a heating element comprising heat responsive means, a control switch associated with said heat responsive means for automatic operation thereby, means for rotatably adjusting said heat responsive means for operation of said control switch at a predetermined temperature, a line-switch in the control switch circuit, and a single manually operable means for actuating said line-switch and for operating said adjusting means, said manually operable means comprising a rotatable shaft and an actuating handle therefor rotatable on an axis angularly related to the axis of rotation of said adjusting means.

3. In a stove, a current control for a heating element comprising heat responsive means, a control switch associated with said heat responsive means for automatic operation thereby, a line-switch in the control switch circuit, a single manually operable means for actuating said line-switch and for adjusting said heat responsive means for operation of said control switch at a predetermined temperature, a temperature calibrated indicator associated with said manually operable means to indicate the positioning of the line-switch and the adjustment of the heat responsive means for actuation of the control switch in accordance with a desired temperature and a pilot light connected for operation by said line-switch and positioned for illumination of said indicator.

4 In a device of the character described, heat responsive means movable upon temperature change, a control switch associated with said heat responsive means and movable thereby to open circuit and closed circuit positions, within a predetermined range of temperature, manually rotatable adjusting means for said heat responsive means, a line snap switch, a toggle member thereon having a slot therein, means on said manual adjusting means for actuating said line-switch comprising a pin rotatable therewith and engageable with said toggle slot during movement of the manual adjusting means and the heat responsive means beyond the normal temperature range of operation of the control switch.

5. In a control device of the character described, manually adjustable heat responsive means automatically movable upon temperature change, a control switch associated with said heat responsive means and movable thereby, a line-switch in the control switch circuit, a single manually operable means for actuating said line-switch and for adjusting the positioning of said heat responsive means, and means for adjustably setting the relative positioning of said manually operable means and said heat responsive means independently of the relative positioning of the manually operable means and the line switch.

6. In a device of the character described, heat responsive means movable upon temperature change, a control switch movable thereby, manually operable adjusting means for said heat responsive means, a positive continuously engaged driving connection between said manually operable adjusting means and heat responsive means for movement thereof upon movement of said manually operable adjusting means, a line-switch, and means on said manually operable means for actuating said line-switch, said actuating means affording a driving connection between the manually operable means and the line-switch only during actuation of said line-switch.

7. In a device of the character described, heat responsive means rotatably movable upon temperature change and rotatably adjustable, a control switch movable by said heat responsive means, means for rotatably adjusting said heat responsive means comprising a manually operable shaft rotatable on an axis perpendicular to the axis of rotation of the heat responsive means, a gear on said shaft, a gear on said heat responsive means, a geared connection between said shaft gear and the gear of said heat responsive means, a line-switch in the control switch circuit, and means on said shaft for actuating said line-switch during rotation of said shaft beyond the normal working range of the heat responsive means.

8. In a device of the character described, heat responsive means movable upon temperature change and rotatably adjustable, a control switch movable by said heat responsive means, a gear on said heat responsive means, a manually operable shaft rotatable on an axis angularly related to the adjustment axis of the heat responsive means, a gear on said shaft, a pivotally mounted lever for communicating movements of said shaft to said heat responsive means, said lever having gear members in engagement with the gear of said heat responsive means and the gear of the operating shaft, a line-switch series connected to the control switch, line-switch operating means on said operating shaft coordinated as to positioning with respect to the intergeared connection to the heat responsive means for operation of said line-switch beyond the normal operating range of the heat responsive means, and indicating means on said shaft for indicating the positioning of the line-switch and of the heat responsive means.

BERTRAND B. KAHN.